Aug. 12, 1941.    C. G. PALMER    2,252,094
DEVICE FOR PEELING POTATOES AND THE LIKE
Filed April 28, 1939
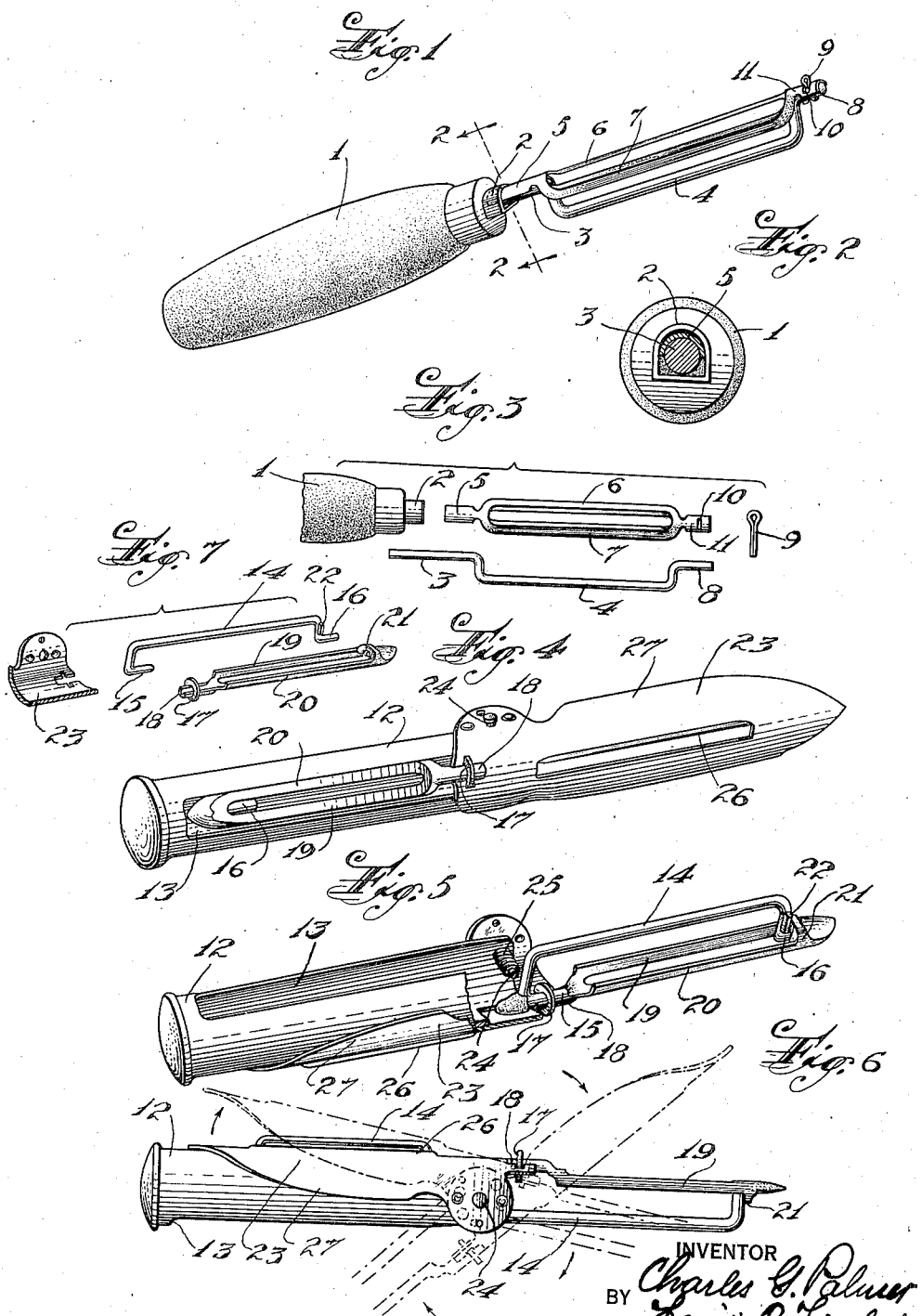
INVENTOR
Charles G. Palmer
BY Fred C. Fischer
ATTORNEY Patented Aug. 12, 1941

2,252,094

UNITED STATES PATENT OFFICE 2,252,094

DEVICE FOR PEELING POTATOES AND THE LIKE

Charles G. Palmer, Newark, N. J.

Application April 28, 1939, Serial No. 270,547

5 Claims. (Cl. 30—279)

This invention relates to devices for peeling potatoes and the like, and more particularly to improvements enabling the convenient and rapid peeling of potatoes with a minimum loss.

Heretofore, devices for peeling potatoes have comprised blades which were no better than ordinary knives in operating over rough surfaces of potatoes, often resulting in an appreciable percentage of the potato being wasted during the peeling operation.

It is, therefore, an object of this invention to provide a device for peeling potatoes and the like, said device having rocking cutters which automatically adapt themselves to properly peel uneven surfaces of a potato.

A further object is the provision of a device comprising a potato peeler and slicer, a vegetable cutter and a scraper combined into a single tool, having folding parts arranged to place any desired part in position for use by a simple folding movement.

These and other advantageous objects, which will later appear, are accomplished by the simple and practical construction and arrangement of parts hereinafter described and exhibited in the accompanying drawing, forming part hereof, and in which:

Fig. 1 is a perspective view of the device embodying my invention,

Fig. 2 is a sectional view taken on line 2—2 of Fig. 1,

Fig. 3 is an exploded view showing elements of the device shown in Fig. 1,

Fig. 4 is a perspective view of one side of a modified form of the invention,

Fig. 5 is a perspective view of an opposite side of a modified form,

Fig. 6 is an elevational view, showing in dotted lines the various positions assumed by elements of the modified form of the device, and Fig. 7 is an exploded view of elements of the modified form of the device.

Referring to Fig. 1, the potato peeling device is shown to include a handle 1, having a metal collar 2 frictionally receiving one end 3 of a shaft having an outwardly bent portion 4, the collar also receiving the arcuate end 5 frictionally of a cutter having spaced knives 6 and 7. The other end 8 of the shaft 4 is connected, by a cotter pin 9 movable in a slot 10, to an arcuate portion 11 of the cutting blade similar to part 5, thus the cutter is able to oscillate on the portions 3 and 8 of the shaft. The cotter pin 9 moving in the slot 10 limits the extent of oscillation. By means of the structure herein described, the peeling of potatoes is greatly facilitated as the cutter will rock to automatically accommodate the blades to take care of uneven portions of a potato. With such a mode of peeling potatoes, there is practically no loss and the peeling operation is conveniently and quickly performed.

In Figs. 4 to 7 is shown a modified form of the device, in which a handle 12, preferably made from a metal tube, has one side open at 13 to receive the bowed portion 14 of a wire shaft having offset end portions 15 and 16. The portion 15 is rotatably mounted in a bearing 17, which also receives the arcuate end 18 of an arcuate cutter having cutting blades 19 and 20. The opposite end of the cutter is provided with a boss 21 rotatably receiving the end 16 of the shaft, which is provided with a lug 22 engageable with the cutter to limit the rocking movement of the cutter.

The bearing 17 is integral with an arcuate blade 23 which is hingedly connected by a hinge pin 24 and coil spring 25 to the handle 12. The blade 23 has a central longitudinal strip 26 pressed outwardly and having its edges sharpened to provide a cutter adapted to slice or cut potatoes in strips. The edges 27 of the blade can be used for scraping various vegetables such as carrots, potatoes, etc.

When it is desired to use the blade 23 as a scraper or cutter, the bowed portion 14 with the cutting blades 19 and 20 are folded into the opening 13 as shown in Fig. 4. When it is desired to peel potatoes, the arcuate blade 23 is folded over handle 12 as shown in Fig. 5.

From the above description it will be seen that there has been provided a simple and effective tool for peeling potatoes. The device shown in Fig. 1 is essentially a potato peeler, while the combined structure shown in Fig. 4 can be used for many other purposes besides peeling potatoes, and presents a compact tool embodying a slicer, shredder, corer and peeler. The parts are simple and rugged, so that they will not get out of order when used in the usual manner.

The blade 23 has a pointed end so that it can be used as a corer to core apples and the like. When the blade 23 is turned at right angles to the handle, the blades 19 and 20 can be used to shred cabbage, etc.

The foregoing disclosure is to be regarded as descriptive and illustrative only, and not as restrictive or limitative of the invention, of which, obviously, embodiments may be constructed, including many modifications, without departing from the spirit and scope of the invention herein set forth and denoted in the appended claims.

Having thus described my invention, what I claim as new and desire to secure by Letters Patent, is:

1. In a potato peeler, a handle having a collar at one end, a shaft having both ends offset, one being frictionally mounted in the collar, an arcuate cutter having one end frictionally and rotatably received in the collar partially circumjacent said shaft end, said cutter having arcuate cutting blades, said shaft having its main straight portion spaced above the blades, the opposite end of the cutter having a slot, and a cotter pin movable in the slot and connecting the other offset end of the shaft to the cutter.

2. In a potato peeler, a handle having a collar at one end, a shaft having one end frictionally mounted in the collar, an arcuate cutter having a pair of spaced blades, said cutter having one end frictionally and rotatably received in the collar, said shaft having a bowed portion above the blade, the opposite end of the cutter having a slot, and a pin movable in the slot and connecting the other end of the shaft to the cutter.

3. In a potato peeler, a handle having a collar at one end, a shaft having a straight central portion and aligned offset ends, one offset end being frictionally mounted in the collar, an arcuate cutter having a pair of spaced blades, said cutter having one end frictionally and rotatably received in the collar, the opposite end of the cutter having means cooperating with means on the other offset end of the shaft for connecting the said end of the shaft to the cutter, whereby the cutter is adapted to oscillate on the aligned offset ends of the shaft.

4. In a potato peeler, a handle, a shaft having a straight central portion and aligned offset ends, one offset end being frictionally mounted in the handle, an arcuate cutter having a pair of spaced blades, said cutter having one end frictionally and rotatably mounted on one offset end of the shaft, the opposite end of said cutter being frictionally and rotatably received on the other offset end of the shaft, whereby the cutter is adapted to oscillate on the aligned offset ends of the shaft.

5. In a potato peeler, a handle, a shaft having a straight central portion and aligned offset ends, one offset end being frictionally mounted in the handle, a cutter having a pair of spaced blades and arcuate ends, said cutter having one of its arcuate ends frictionally and rotatably mounted on one offset end of the shaft, the opposite arcuate end of said cutter being frictionally and rotatably received on the other offset end of the shaft, whereby the cutter is adapted to oscillate on the aligned offset ends of the shaft.

CHARLES G. PALMER.